United States Patent [19]
Kastelle

[11] Patent Number: 5,124,919
[45] Date of Patent: Jun. 23, 1992

[54] TEST DEVICE FOR AUTOMOBILE ENGINE IDLE SPEED CONTROL CIRCUIT

[76] Inventor: Harald W. Kastelle, 12038 Dewey St., Los Angeles, Calif. 90066

[21] Appl. No.: 648,547

[22] Filed: Jan. 30, 1991

Related U.S. Application Data

[63] Continuation-in-part of Ser. No. 394,743, Aug. 16, 1989.

[51] Int. Cl.⁵ .................................... G01M 19/00
[52] U.S. Cl. .................... 364/424.03; 364/551.01; 73/118.1; 324/542
[58] Field of Search ............ 364/424.03, 424.04, 364/431.08, 431.12, 431.07, 551.01, 424.01, 431.01, 431.11, 481, 482, 483, 550; 73/116, 117.2, 118.1, 119 R, 119 A; 324/133, 542, 556

[56] References Cited

U.S. PATENT DOCUMENTS

| | | | |
|---|---|---|---|
| 4,274,144 | 6/1981 | Meyer et al. | 73/117.2 |
| 4,300,205 | 11/1981 | Tansuwan | 364/431.01 |
| 4,567,756 | 2/1986 | Colborn | 73/118.1 |
| 4,756,186 | 7/1988 | Sangawa | 73/119 A |
| 4,764,727 | 8/1988 | McConchie, Sr. | 324/542 |
| 4,831,560 | 5/1989 | Zaleski | 364/551.01 |
| 4,945,760 | 8/1990 | Hornung | 73/118.1 |

OTHER PUBLICATIONS

Alltest Part No. 1005; Computerized Engine Controls Manual; pp. 690, 748, 969, Alltest; 2125 Stonington Ave., Hoffman Estates, Il. 60195; 1985.
Alltest Reference Guide to Alltest Professional Diagnostic and Test Equipment; Alltest; 1987; Form No. AL-211-87.
Alltest Model 3258 Brainmaster II; Alltest; 1988; Form No. 009-88.
Alltest Model All Scan . . . 1; Alltest Brochure 1988; Form No. 003-88.
OTC Catalog A86; OTC Tool & Equipment Division; Sealed Power Corporation; 655 Eisenhower Drive; Owatonna, MN 55060, pp. 27-37; 1986.
Tools & Techniques Book Part No. 103, 074; OTC Tool & Equipment Division; pp. 12, 13, 16, 17, 91, 155, 387, 585; 1987.
Tools & Techniques Book Part No. 103, 119; OTC Tool & Equipment Division; pp. 12, 13, 16, 17, 112, 433; 1987.
Snap-On 1988-1989 Catalog; Snap-On Tools Corp.; Kenosha, WI, 53141-1410; p. 333; Sep. 1988.
Pro-Link 9000 Brochure; Micro Processor Systems, Inc.; 6405 19 Mile Rd., Sterling Heights, MI 48078; Feb. 1989.
Automotive Handbook 2nd Ed.; Robert Bosch GmbH; Postfach 50, D-7000 Stuttgart 1, Federal Republic of Germany; p. 377; Sep. 1986.

*Primary Examiner*—Parshotam S. Lall
*Assistant Examiner*—Michael Zanelli
*Attorney, Agent, or Firm*—Beehler & Pavitt

[57] ABSTRACT

A portable self-contained instrument for testing the idle speed control system in an automotive engine includes LED indicators for displaying engine computer output pulses to the idle speed stepper motor, and a multi-pole rotary switch connected to an internal battery for deriving the voltages necessary for exercising the stepper motor. A mode switch allows normal engine operation while monitoring the computer output on the LEDs, or connects the rotary switch for controlling the stepper motor while disabling the computer.

18 Claims, 7 Drawing Sheets

TEST DEVICE FOR AUTOMOBILE ENGINE IDLE SPEED CONTROL CIRCUIT

RELATED APPLICATIONS

This application is a continuation-in-part of application Ser. No. 07/394,743 filed Aug. 16, 1989.

BACKGROUND OF THE INVENTION

The present invention is a device for rapid and unambiguous troubleshooting of the idle speed control circuit in a computer controlled automobile engine.

Miniature computers are widely used to control many functions in automobile engines. One function is to control the engine idle speed based upon temperature. air conditioner load, shift lever position, and difficult The engine frequently stalls and then the function cannot be tested. In the prior art, four troubleshooting methods were commonly used:
1. Parts replacement.
2. Engine data Mini Scanners.
3. Trouble shooting procedures.
4. Kits of test wires.

In the first method the mechanic merely continues replacing parts until the problem is solved. Obviously an expensive and unsatisfactory method.

The second method is to use an engine data Mini Scanner. These scanners are available from several companies. ALLTEST Model 3258 (prior art reference AT) and OTC No. 213481 (prior art reference AY) are examples of engine data Mini Scanners. The scanners display a number from the computer which is a numerical representation of the idle speed control output of the computer. However, the number thus displayed only shows a number from the variable memory inside the automobile computer. The speed control number does not necessarily represent the output signal to the idle speed control stepper motor. Also, the scanner cannot directly display the action of the stepper motor itself. The scanner indirectly shows the stepper motor action by displaying the engine RPM. This indirect display leads to ambiguities in trouble shooting, since other engine parts can cause idle speed problems.

The third method involves complicated trouble shooting procedures which are printed in various manuals and handbooks (prior art references AX and AY). A good example of the confusing procedures is page 387 in "Tools and Techniques Book" (reference AX).

The fourth method involves kits of test wires. Some kits are made by the mechanic, and some are sold by test equipment manufacturers Kits 3456 and 3458 on page 33 of prior art reference AW are two examples. Usage of kit 3456 or 3468 shown is likely to result in mistaken connections which may destroy the computer or the idle speed control stepper motor.

A review of the current manufacturers catalogs and literature (prior art documents AR thru BC) has not revealed any test equipment which even remotely resembles that disclosed in this application. Applicant is not aware of any other test equipment or methods for troubleshooting an automobile engine idle speed control circuit.

It would therefore be an advance in the art to provide test equipment which would enable the mechanic to rapidly and unambiguously determine which element of the idle speed control circuit is defective. This application describes such test equipment.

SUMMARY OF THE INVENTION

The device provides displays and controls to aid the mechanic in troubleshooting the idle speed control circuit. Light emitting diodes (LEDs) are used to dynamically display to the mechanic the output signals of the computer. Controls are provided so the mechanic can manually test the idle speed control stepper motor without removing it from the engine. The device may be connected to the engine or disconnected in less than 5 minutes. The device may also be used to adjust the pintle extension of a new stepper motor prior to installing it in the engine.

The invention is directed to a low cost, portable and easy-to-use test instrument for testing the operation of the idle speed control system in an automotive engine where the idle speed is set by a two-coil stepper motor driven through a four conductor engine cable connected to the output of an engine control computer. The novel test instrument has visual indicators, such as LEDs, for displaying signal output from the control computer to the engine cable, a self-powered stepper drive circuit for driving said stepper motor, a first connector for connecting the indicator means to the engine cable, a second connector for connecting to the coils of the stepper motor; and a first switch for selectively connecting the second connector means either to the stepper drive circuit in a first mode of operation or to the first connector in a second mode of operation of the test instrument.

The stepper drive circuit may include a four-pole multiple-position second switch connected for switching polarities at the second connector means to turn the stepper by one step for each position change of the switch. The second switch may be connected to a battery for supplying power to the stepper motor. The second switch may be a mechanical manually operated switch, in particular a four-pole, twelve position non-shorting rotary switch wherein the four poles at each position of the switch are connected to a battery so as to supply a sequence of polarities to the input of the stepper motor calculated to advance the stepper motor by one position for each step of the second switch, in a direction dependent on the direction of movement of the second switch. A single nine volt battery may be used.

Preferably, the indicators, stepper drive circuit, and first switch are mounted in a common housing or box which has a front panel, and the indicators and first switch are mounted on the front panel, and the stepper drive circuit has a control, such as the knob on a rotary switch shaft, also mounted on the front panel. The panel has a left side and a right side, the first connector is attached to the housing at its left side, the second connector is attached to the housing at its right side, the indicators are proximal to the left side, and the stepper drive control is proximal to the right side.

The indicators may be visual indicators such as Light Emitting Diodes (LEDs) and preferably include a separate indicator for each conductor of the engine cable, to allow easy perception of the presence or absence of a control signal on each conductor of the engine cable. In a preferred form of the invention, the first and second connectors are mateable to each other in a self-test mode of the instrument 1 for displaying the output of the stepper drive circuit on the indicators thereby to verify operation of the instrument.

First and second groups of test connection points may be provided on the panel for electrically connecting other test instruments to the first second connectors respectively. Indicia may be printed on the panel for suggesting the proper connection between the first and second connectors to the engine cable and stepper motor under test. The first and second groups of test connection points each may include a test point for each conductor in the engine cable, and desirably each test point in the first group is adjacent to a visual indicator means associated with a corresponding conductor of the engine cable and thus, with a given input connection of the stepper motor.

For ease of use, the visual indicators and the test points of the first group are best arranged in parallel columns adjacent to the left side of the panel, with indicia on the panel indicative of the stepper motor coil connections made by each of the engine cable conductors and each test point. Additional indicia on the panel may indicate the connections made by the second connector between the test points of the second group and the stepper motor, and also the impedance values of the coils of the stepper motor.

It should be appreciated that the present invention provides a general arrangement for conveniently testing the operation of various voltage polarity or logic level operated devices driven by an automobile computer, including but not limited to stepper motors. This novel general arrangement includes connectors for connecting the test instrument between the computer and the device, indicators for displaying control signal output signals of the automobile computer, a device driver circuit for supplying control signals to the device under test, and a mode switch for selectively connecting the device either to the computer in a first mode of operation or to the device driver circuit in a second mode of operation of the test instrument. This arrangement allows quick and easy switching between a normal, computer driven mode of operation of the device under test while the computer control signals are observed on the displays, and a test mode of operation wherein the device is driven by the test device under control of an operator while the response of the automobile computer to the operator's adjustments is observed on the displays without need for reconnecting any of the cable connectors of the test instrument. This generalized arrangement for a test instrument also allows connecting the device driver output to the input of the displays for self-testing of the test instrument.

The device driver circuit in such an arrangement will typically include switching devices and controls for stepwise changing the polarities or logic levels, as the case may be, of signals supplied to the device by the driver circuit in a sequence adapted to simulate proper operation of the device by the automobile computer. The device driver circuit may include mechanical switches operated by rotating a control shaft, or solid state devices connected for performing the equivalent functions of such mechanical switches, and the switch in the following specification and claims is defined to include such equivalent solid state devices.

Still another aspect of this invention is directed to the use of a four-pole multiple-position non-shorting rotary switch means connected to a direct current source for switching polarities to the coils of a stepper motor with each step of the switch from one switch position to another in a sequence adapted to turn the stepper motor in one step increments in a direction dependent on the direction of movement of the switch. The four poles of the switch can be connected to a single battery, such as a 9 volt battery, for supplying the various polarity combinations at the four input connections of a two-coil stepper motor needed to turn the motor in one direction or another.

BRIEF DESCRIPTION OF THE DRAWINGS

The advantages, novelty, and operation of the device will become apparent from the detailed description and accompanying drawings, in which:

FIG. i shows how the device is connected to the engine cable and to the idle speed control stepper motor in the throttle body of a typical automobile engine.

FIG. 7 also shows a schematic diagram of the output transistors in the ECM. These transistors are not part of the invention, but are included to aid in understanding how the invention functions. FIG. 7 also shows the wiring of LEDs 20 through 23, test points 12 through 19, and four resistors 24. FIG. 7 also shows the wiring of cables 2 and 5.

DETAILED DESCRIPTION OF THE PREFERRED EMBODIMENT

The present invention is a device which enables the automobile mechanicto rapidly and unambiguously determine which element of the idle speed control circuit is faulty.

Figure 1:
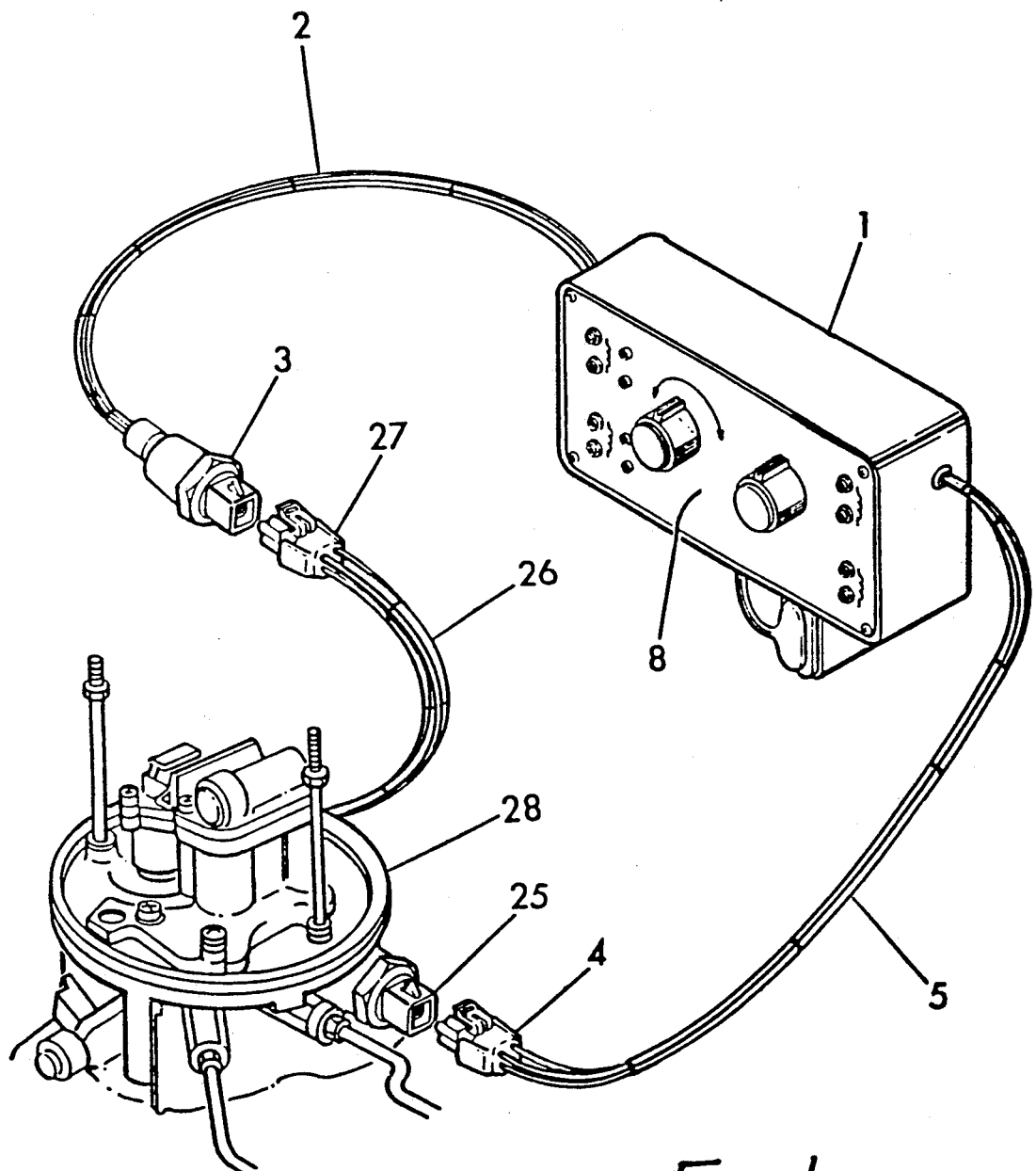

FIG. 1 shows how the device is connected to the engine. The term "throttle body" is almost synonymous with "carburetor". The idle speed control stepper motor is commonly referred to by the acronym "IAC". The device is connected to the throttle body by:
1. First, disconnecting engine cable connector 27 from IAC connector 25.
2. Next, connecting device connector 4 to IAC connector 25 as shown.
3. And finally connecting device connector 3 to engine cable connector 27.

In FIG. 1, rectangular box 1 has one side open and provisions for mounting panel 8. Cables 2 and 5 connect the circuits in the box to the device connectors 3 and 4 respectively. Engine cable connector 27 connects to IAC connector 25 when the test device is not connected to the engine. Engine cable 26 carries the idle speed control signals from the computer to connector 27 and thence to IAC connector 25. The IAC is screwed into throttle body 28 of a typical computer controlled automobile engine.

The result of the connections shown in FIG. 1 is to interpose the test device between the computer and the IAC. This interposition enables the device to perform the functions which will be described.

In FIG. 1, the test device of this application consists of connector 3, cable 2, box 1, panel 8, cable 5 and connector 4. Panel 8 is shown in more detail in FIGS. 4, 5 and 6.

Figure 7:
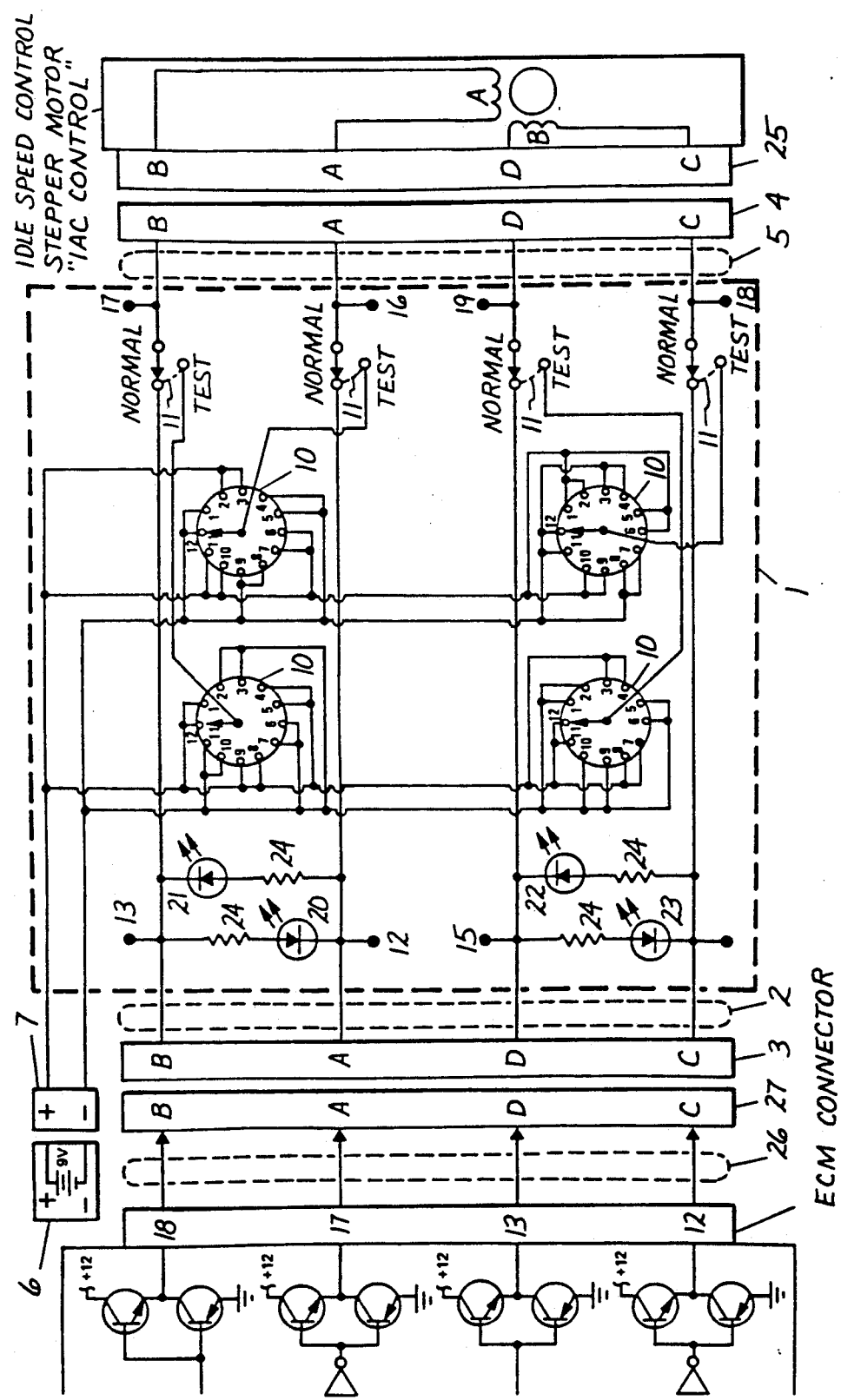
FIG. 7 is similar to FIG. 3 except that it shows a detailed schematic diagram of the test device including the wiring of switch 11 and the coded wiring of switch 10.

Complete details of the wiring of panel 8 are shown in FIG. 7. Switches 10 and 11 are wired as shown in FIG. 7. resistors 24 are wired as shown in FIG. 7. Test points 12 through 19 are wired as shown in FIG. 7. Cables 2 and 5 are wired as shown in FIG. 7.

Figure 2:
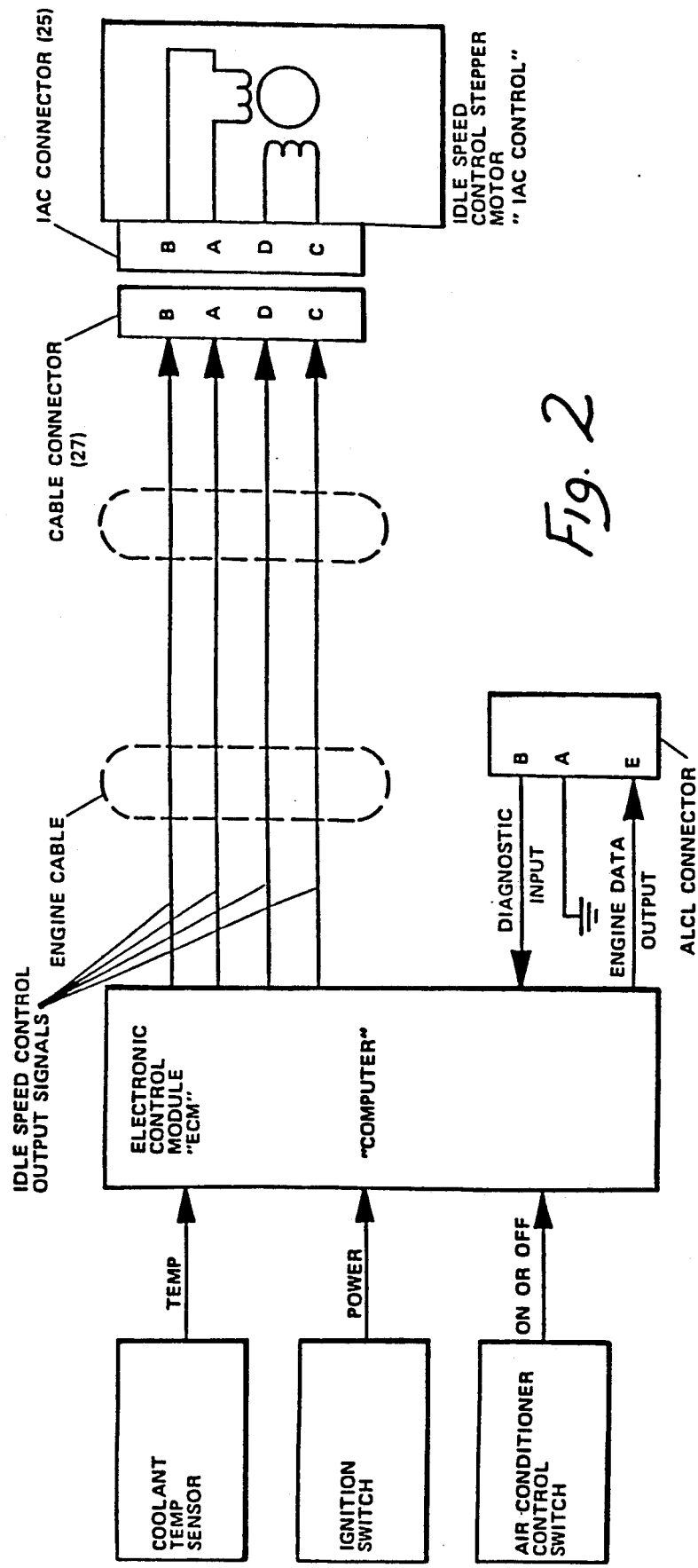
FIG. 2 is a block diagram of a Typical Idle Speed Control Circuit in an automobile engine. The circuit is shown without the test device connected. The figure shows the elements of the circuit. Idle Speed Control (ISC) is also known as IDLE AIR CONTROL (IAC).

A brief description of a typical automobile idle speed control circuit is necessary in order to explain the operation of the present invention. FIG. 2 is a block diagram which shows the essential elements of the circuit. The coolant temperature sensor transmits to the computer a signal which represents the temperature of the coolant as it flows out of the engine block. The ignition switch sends a signal to the computer that the driver is starting or stopping the engine. The air conditioner control switch sends a signal which indicates whether or not the air conditioner is on. These signals are used by the computer to adjust the idle speed and prevent stalling. The computer adjusts the idle speed by means of control signals via the engine cable to the idle speed control stepper motor (more commonly known as "Idle Air Control" or "IAC"). The IAC controls the idle speed by adjusting the air bypassing the throttle plate in the throttle body. The computer (more commonly referred to as "ECM") controls the idle speed during several different circumstances of engine operation:

1. Idle speed is gradually reduced as a function of coolant temperature rise after engine start.
2. Idle speed is changed by a fixed amount to compensate for the change in load when the air conditioner is turned on
3. Idle speed is increased by a fixed amount when the ignition switch is turned off. This increase prepares the engine for the next time it is started.

The above described control circuit is very difficult for the mechanic to troubleshoot, especially when there are intermittent signals out of the ECM, poor connections between the engine cable connector and IAC, or a sticking IAC. Any one of these problems can cause the engine to stop, thus ending the troubleshooting. In the prior art, one troubleshooting method was to connect a Mini Scanner (typically prior art AT) to the ALCL connector shown in FIG. 2. The ECM sends a stream of engine data output signals to the Assembly Line Communication Link (ALCL) connector. The mechanic reads the data signals by connecting the Mini Scanner (prior art AT) to the ALCL connector in FIG. 2. These signals represent many different physical quantities inside the engine. One of these quantities is a number representing the idle speed control. The Mini Scanner displays these quantities to the mechanic. However, the Mini Scanner thus connected cannot display the control signals from the computer via the engine cable to the IAC. The present invention can display these control signals as shown by the connections in FIG. 3.

Figure 3:
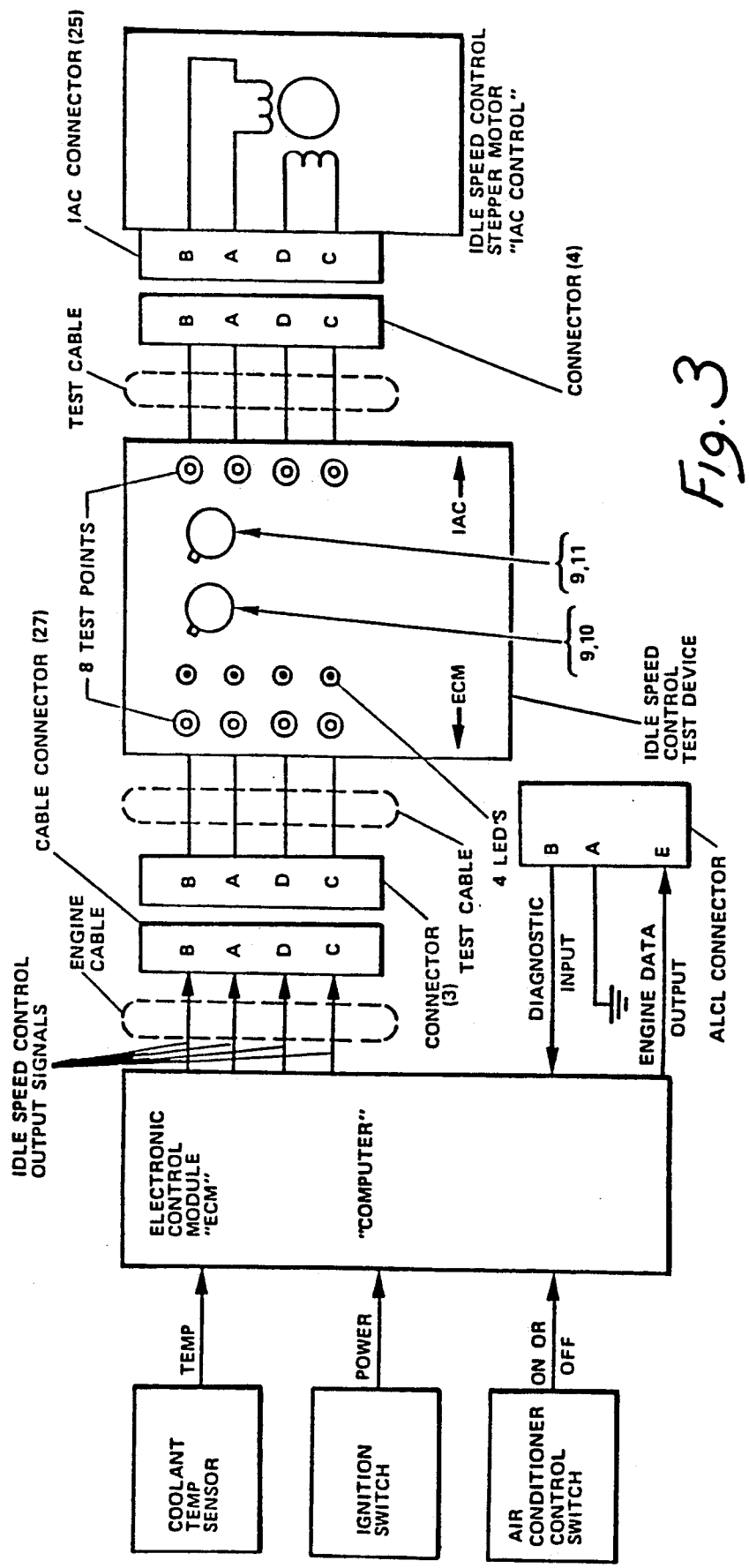
FIG. 3 is the same as FIG. 2 except it shows the test device interposed between the engine cable and the Idle Speed Control Stepper Motor.

FIG. 3 is the same as FIG. 2 except that the Idle Speed Control Test Device is shown interposed between the ECM and the IAC. FIG. 3 is a block diagram of the same connections which are shown pictorially in FIG. 1. Eight test points, four light emitting diodes (LEDs) and two switches 10 and 11 are provided. The test points, LEDs and switches enable the mechanic to quickly determine which element of the circuit is faulty.

In FIG. 3, device connector 3 is shown connected to engine cable connector 27. Also, device connector 4 is shown connected to IAC connector 25.

Figure 4:
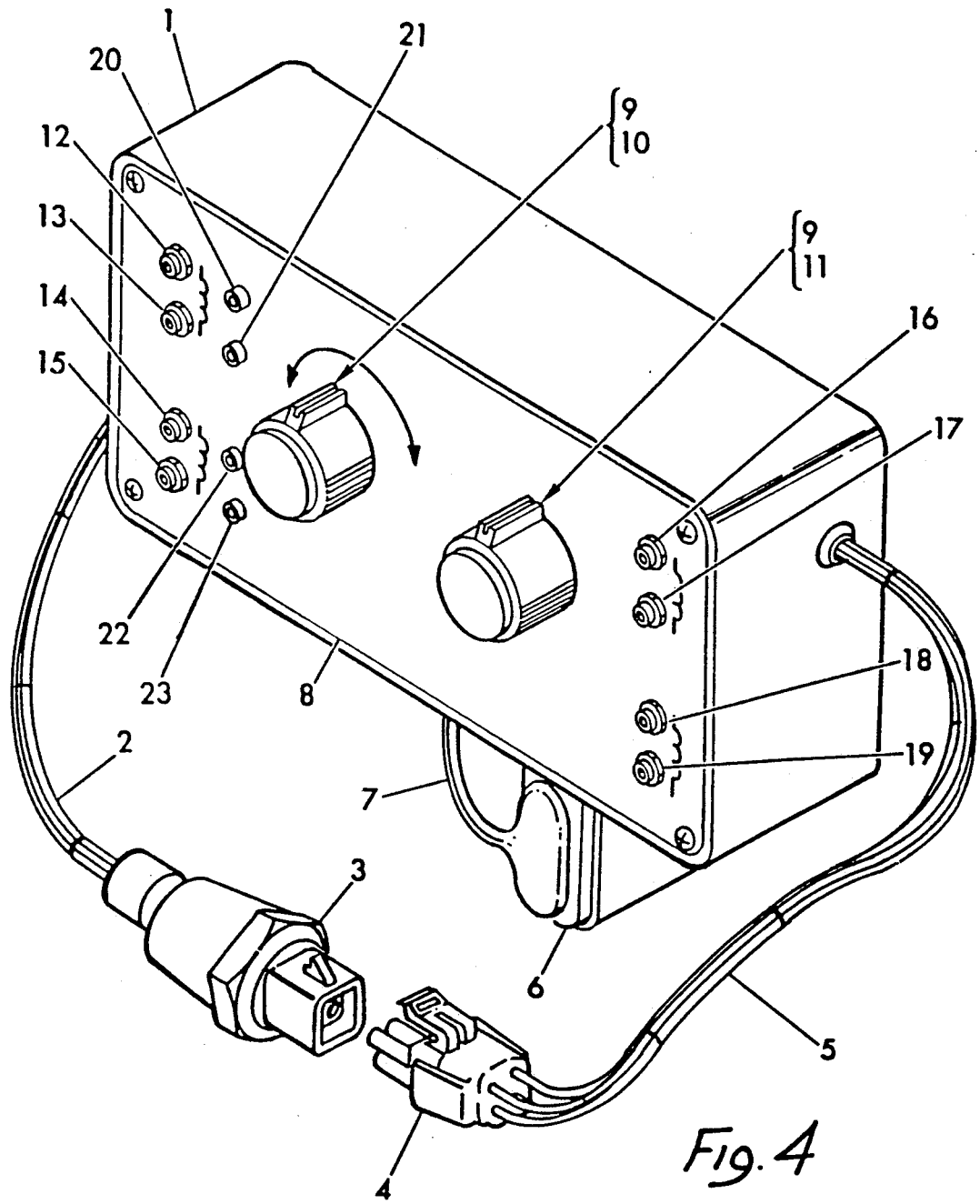
FIG. 4 is an exterior view of the device showing most of the parts.
Figure 5:
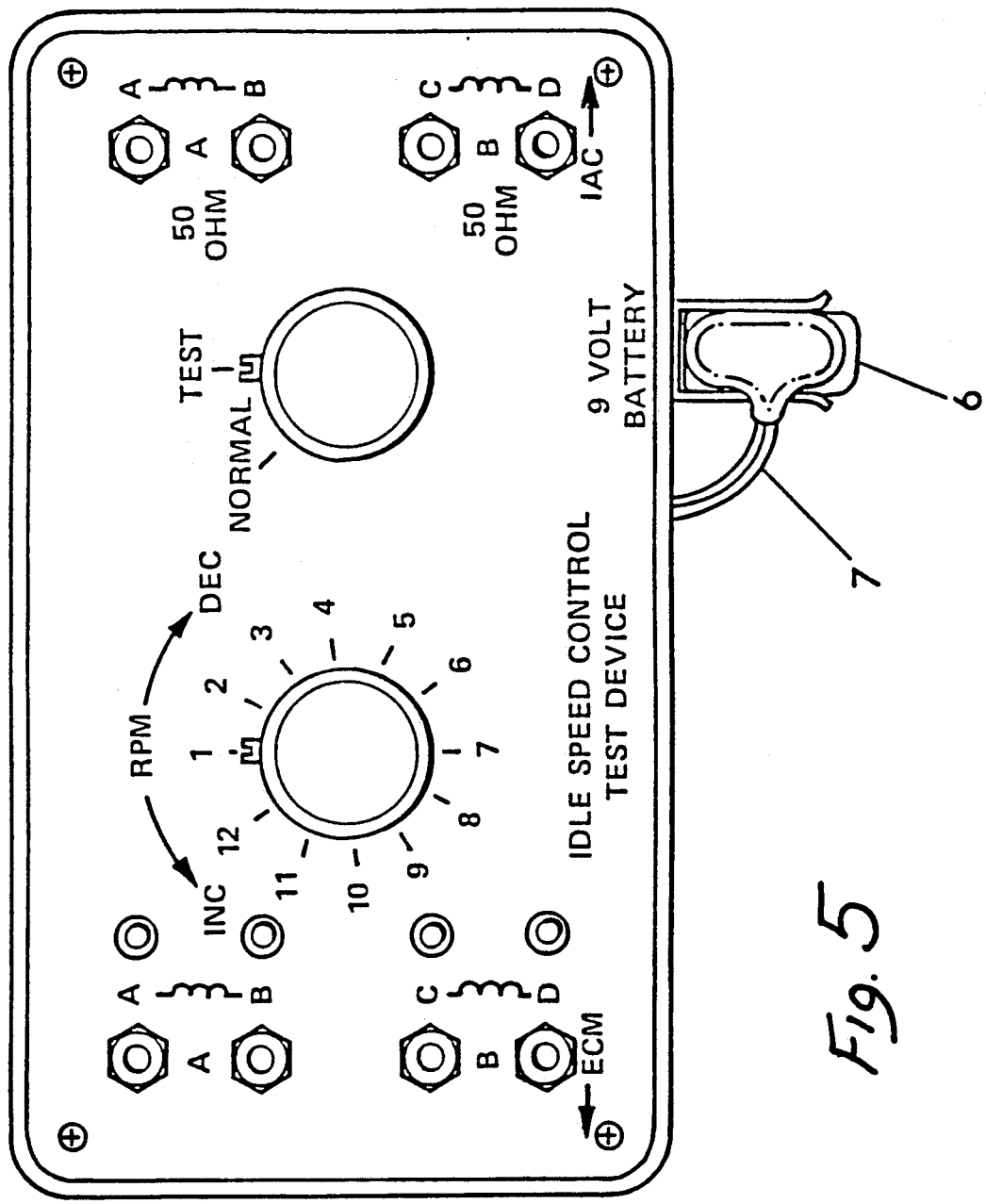
FIG. 5 is a drawing of front panel 8 showing the displays, controls and important marking details.

FIG. 4 shows exterior details of the idle speed control test device. Connector 3 consists of four female pins in a molded plastic housing similar to IAC connector 25 in FIG. 1. Connector 4 consists of four male pins in a molded plastic housing similar to connector 27 in FIG. 1. Cables 2 and 5 are four-wire cables similar to engine cable 26 of FIG. 1. Test points 12, 13, 14, 15, 16, 17, 18, and 19 are common test jacks made to match test prods of ordinary voltmeters. Light emitting diodes (LEDs) 20, 21, 22, and 23 are green LEDs similar to Radio Shack catalog number 276-069. Nine volt battery 6 provides power for the device. Battery connector 7 serves to carry power from the battery to the device. Holes are drilled in box 1 to admit cables 2, 5, and battery connector 7. Panel 8 provides a mounting for all the test points, LEDs, and switches. Details of panel 8 are shown in FIG. 5. Complete wiring of panel 8 is shown in FIG. 7. In FIG. 4, knob 9 is mounted on the shaft of switch 11 which is a Centralab PA-2011 four pole two position, non-shorting, rotary switch. Knob 9 is Radio Shack catalog number 274-433. An identical knob 9 is mounted on the shaft of switch 10 which is a four pole, twelve position, non shorting, rotary switch. The mechanical stops of switch 10 have been removed so that it is free to rotate more than 360 degrees in either direction. Panel 8 is secured to box 1 by four corner screws shown in FIG. 5.

FIG. 5 shows battery 6, battery connector 7, and the special markings on panel 8. The left pointing arrow and the marking "ECM" indicate to the mechanic that the four test points and LEDs at the left end refer only to signals from the ECM. Signals from the ECM come into the left end of the box. The mechanic may connect voltmeters, oscilloscopes and other test equipment to the left most test points to test the idle speed control output signals from the ECM. The right pointing arrow and the marking "IAC" indicate to the mechanic that the four right most test points refer only to the IAC. The coil symbols are memory devices to aid the mechanic in testing the coils of the IAC stepper motor. The words "50 OHM" help the mechanic remember the approximate resistance of the stepper motor coils. Signals to the IAC come out of the right end of box 1. These panel markings enable the mechanic to perform the tests without referring to any written test procedures or manuals. The signals proceed from the ECM to the left end of the box, thru the box from left to right, and thence to the IAC. This left-to-right signal flow on the panel is the same as the signal flow in the idle speed control circuit of the automobile. In FIG. 5, the four ECM test points at left are labeled A, B, C, and D corresponding to the pins on device connector 3. The published literature (for example prior art AX) refers to the stepper motor windings as "Coil A" and "Coil B". The coil symbols on panel 8 are labeled A and B for consistency with the published literature. Battery 6 and connector 7 are located outside of the box for rapid replacement of the battery. The four IAC test points at right are labeled A, B, C, and D corresponding to the pins on device connector 4. FIG. 7 shows the entire schematic diagram of the test device. The figure shows connector 3 and 4, test points 12 through 19, four resistors 24, switch 10, switch 11, and LEDs 20 through 23. To aid in understanding the circuit a partial schematic diagram of the ECM is shown in FIG. 7. The figure shows eight output transistors. These transistors control the polarity of the idle speed control output signals. The central processing unit (CPU) controls the time sequence of the signals. The signals proceed from the ECM to the test device via connectors 27 and 3. As shown in FIG. 7, LEDs 20 and 21 are connected in opposite polarity across pins B and A of connector 3.

Four resistors 24 are 470 ohm, 5%, ½ watt, carbon resistors similar to Radio Shack catalog number 271-019. The resistors limit the current to the LEDs. The resistors also provide fixed and consistent electrical loads across the ECM output signals. LEDs 22 and 23 are connected in opposite polarity across pins D and C of connector 3. LED 22 lights when the ECM output signal is positive at pin C and negative at pin D of connector 3. LED 23 lights when the ECM output signal is positive at pin D and negative at pin C of connector 3. LED 20 lights when the ECM output signal is positive at pin B and negative at pin A of connector 3. LED 21 lights when the ECM output signal is positive at pin A and negative at pin B of connector 3. Thus, only two LEDs are lighted at once. LEDs 22 and 23 are spatially separated from each other as shown in FIG. 4. LEDs 20 and 21 are similarly separated.

The opposite polarity connection and spatial separation make it possible to see the ECM signals of both polarities.

Test points 12, 13, 14, and 15 shown in FIG. 7 provide connection access so that the ECM output signals may be measured by voltmeters, oscilloscopes or other test equipment.

With switch 11 in the NORMAL position, all four ECM output signals are routed to test points 16, 17, 18, and 19. From these test points the signals are routed to connector 4 as shown in FIG. 7. Connector 4 is connected to idle speed control stepper motor 25. Thus it can be seen that with switch 11 in the NORMAL position the signals are routed from the ECM to the stepper motor and simultaneously displayed on the LEDs.

In the TEST position of switch 11 the control signals to the stepper motor are disconnected from the ECM and, instead, are connected to the four moving poles of switch 10 as shown in FIG. 7. The LEDs display the output signals from the ECM as described above. Switch 10 controls the signals to the stepper motor shown switch 11 is in the TEST position. Power to switch 10 is provided by battery 6 via connector 7. Switch 10 is a four pole, twelve position, non shorting rotary switch. A non shorting switch is sometimes called a "break-before-make" switch. Switch 10 is wired in a coded pattern so that the rotor of the stepper motor will rotate when the switch is rotated. The direction of the rotation of the rotor will depend upon the direction of rotation of switch 10. There are several features of switch 10 which perform this function:
1. Four pole.
2. Twelve position.
3. Non shorting.
4. Coded wiring pattern.
5. Mechanical stop has been removed.

Four poles permit separate control of every signal to the motor. Twelve positions provide a coding pattern which is continuous over more than 360 degrees rotation. The non shorting contacts remove the connection to one position before connection is made to the next position. This non shorting feature removes power from the stepper motor while switch 10 is in motion from one position to the next. The stepper motor remains fixed in position until switch 10 arrives at the next position.

The coded wiring pattern is one of the major distinctions and advantages of the present invention. The coded wiring pattern is not to by inspection of FIG. 7. Table 1 below is a better illustration of the coded pattern wired into switch 10. The table assumes that switch 11 is in the TEST position. Table 1 shows the switch positions together with the polarity of the voltages at test points 16, 17, 18, and 19. The table shows the control voltage polarities which result from the coded wiring pattern. Following is an explanation of how the stepper motor is caused to rotate by rotating of switch 10. The explanation will start with switch 11 in the TEST position and switch 10 in position 1. Reference to Table 1 and FIG. 7. Nine volt power is applied to coil A negative to pin A and positive to pin B of connector 25. Nine volt power is applied to coil B negative to pin D and positive to pin C of connector 25. These two voltages hold the stepper motor rotor in a fixed position.

Next, switch 10 is moved from position 1 to position 2. The non shorting feature removes all power from the rotor while the switch is in motion from one position to the next. When the switch arrives at position 2, power is applied to coil A positive to pin A and negative to pin B of connector 25. Power to coil B remains the same as in position 1. The polarity change on coil A causes the rotor to rotate 90 degrees.

Next, switch 10 is moved from position 2 to position 3. Table 1 shows the polarity change which occurs. This polarity changes causes the rotor to turn an additional 90 degrees in the same direction as when switching from position 1 to position 2. Rotation of the rotor continues one 90 degree step for each position that switch 10 is rotated. If switch 10 is rotated counter clockwise from position 1 to position 12, then the polarity changes are just the reverse of the polarity changes when moving clockwise from position 1 to position 2. These reversed polarity changes cause the rotor to rotate in a direction opposite to that just described. Thus, the rotor rotates in a direction controlled by the direction of rotation of switch 10 and by an angle controlled by the number of positions through which switch 10 is rotated.

Figure 6:
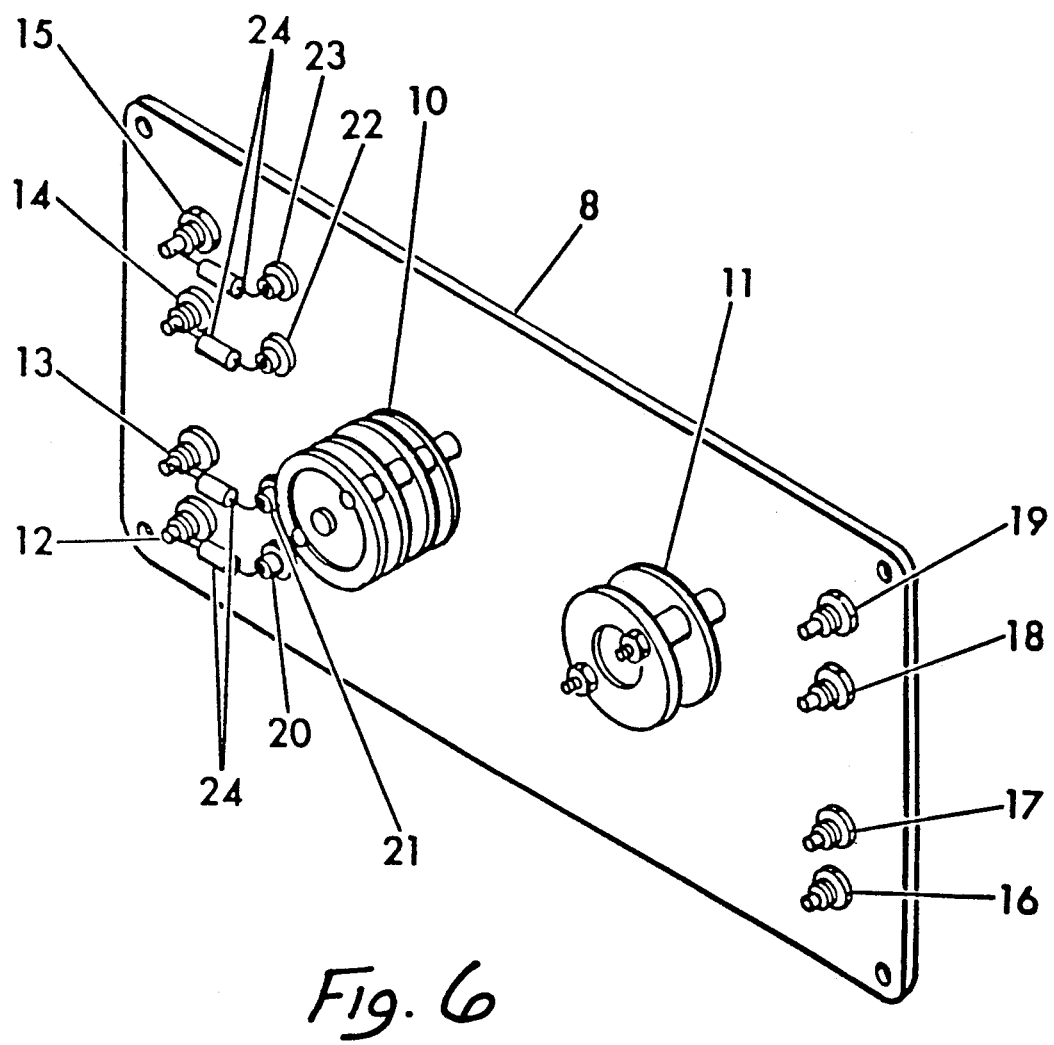
FIG. 6 is an interior view of the device showing the wiring side of the panel and several parts.

FIG. 6 is an interior rear view showing the parts mounted on panel 8. The panel 8 is inverted from the front side view in FIG. 4 and 5.

TABLE 1

| Switch 10 Position | Voltage Polarity at Test Points | | | |
|---|---|---|---|---|
| | 17 | 16 | 19 | 18 |
| 1 | + | − | − | + |
| 2 | − | + | − | + |
| 3 | − | + | + | − |
| 4 | + | − | + | − |
| 5 | + | − | − | + |
| 6 | − | + | − | + |
| 7 | − | + | + | − |
| 8 | + | − | + | − |
| 9 | + | − | − | + |
| 10 | − | + | − | + |
| 11 | − | + | + | − |
| 12 | + | − | + | − |
| 1 | + | − | − | + |
| 2 | − | + | − | + |
| etc. | etc. | etc. | etc. | etc. |

Inspection of Table 1 reveals several features which are a distinct improvement over the prior art:

(1) The coded pattern is continuous while rotating the switch over 360 degrees and over the boundary between positions 12 and 1.

(2) The polarity on two of the test points is always constant for two successive positions of the switch.

(3) Rotating the switch clockwise from any position to the next position produces a polarity change on two test points which is the opposite sense of the polarity change when rotating the switch counterclockwise between the same two positions.

NOVELTY, OPERATION, AND ADVANTAGES OF THE INVENTION

The novelty, operation, and advantages of the present invention may be explained by reference to FIG. 1, 3, 4, 5 and 7. In order to troubleshoot an idle speed problem, the mechanic stops the engine and connects the device as shown in FIG. 1. Connection may be done in less than five minutes. Next, the mechanic turns the ignition switch on (without starting the engine) and connects an ordinary paper clip between pins A and B of the ALCL connector in FIG. 3. This paper clip connection grounds the diagnostic input to the computer. Next, the mechanic connects power from the engine battery to the , fuel pump test connector on the engine. The fuel pump test connector is not shown in FIG. 3, but its location . is well known to mechanics familiar with computer controlled engines. The ECM immediately commences switching the idle speed control signals on and off in a fixed predictable pattern. These control signals may be seen as a predictable flashing pattern on LEDs 20, 21, 22, and 23. All four LEDs should flash. If any one of the LEDs does not flash, then the mechanic may conclude that either the ECM or the engine cable is faulty. If all the LEDs flash, then the mechanic may conclude that the ECM and the engine cable are not faulty.

The next step is to test the Idle Speed Control Stepper Motor (IAC) of FIG. 3. The mechanic remove the paper clip and the wire between the engine battery and the fuel pump test connector. The mechanic then uses the present invention to test the IAC by three different methods.

In the first method the mechanic stops the engine and connects device connector 4 to IAC connector 25 as shown in FIG. 1 and 3. Device connector 3 is disconnected from engine cable connector 27. The mechanic then connects an ordinary ohmmeter across IAC test points 16 and 17 to measure the resistance of coil A of the IAC. The 50 OHM panel marking shown in FIG. 5 reminds the mechanic of the correct resistance. Similarly, the coil symbols remind the mechanic the correct test points to which the ohmmeter should be connected. Next, the mechanic measures the resistance of coil B by connecting an ordinary ohmmeter across test points 18 and 19 of FIG. 4. The special panel markings of FIG. 5 enable the mechanic to perform the tests without referring to any printed procedures or manuals. If the IAC coil resistance is not correct, then the IAC is defective. If the measurements indicate that the IAC coil resistance is correct, then the second method is used to determine if the IAC is rotating correctly. An ordinary ohmmeter is used in this part of the tests. However, use of the ohmmeter is not absolutely required. Most of the tests may be done without any test equipment other than the device of this invention.

In the second method, device connector 4 is connected to IAC 25. Device connector 3 is disconnected as in the first method. The engine is stopped. The mechanic selects position 1 on RPM INC-DEC switch 10. The mechanic selects TEST on NORMAL-TEST switch 11. The mechanic lifts the air cleaner assembly in order to see the top of throttle body 28. FIG. 1 shows the throttle body 28 after the air cleaner assembly has been removed. The mechanic then looks at the pintle end of idle speed control stepper motor (IAC) 25 from a point directly above throttle body 28. While watching the pintle end, the mechanic rotates switch 10 in both directions. When switch 10 is rotated in the INC direction, the pintle should become shorter. When switch 10 is rotated in the DEC direction, the pintle should become longer. The coded wiring of switch 10 causes the stepper motor rotor to rotate 90 degrees for each position that switch 10 is moved. The rotation of the rotor shortens or lengthens the pintle. Switch 10 has no mechanical stops, so the mechanic may rotate it as many times as he desires. The mechanic should keep a mental record of the direction and number of positions that switch 10 has been turned. The panel markings 1, 2, 3, 4, 5, 6, 7, 8, 9, 10, 11, and 12 aid the mechanic in remembering how many positions switch 10 has been turned. This second method enables the mechanic to test the stepper motor separately from the rest of the engine, thus reducing the ambiguity of the test results. At the end of the test, switch 10 should be returned to the starting position by rotating it the same number of positions in the opposite direction. If the pintle does not move correctly, then the IAC is defective. If the pintle moves correctly, then the dynamic tests of the third method are required.

In the third method, device connector 3 is connected to engine cable connector 27 as shown in FIGS. 1 and 3. The air cleaner assembly is reinstalled on throttle body 28. Device connector 4 is connected to IAC 25. The accelerator pedal is blocked in a slightly depressed position and the engine is started. The block is removed from the accelerator and the engine idle behavior is observed. TEST switch 11 is set to the TEST position. In the TEST position, the mechanic may control the signals to the IAC by rotating RPM INC-DEC switch 10. By means of coded wiring, switch 10 controls the rotation of the rotor in the IAC. The mechanic listens to the engine idle speed while rotating RPM INC-DEC switch 10 in both directions. With reference to FIG. 5, the idle speed should increase when switch 10 is rotated in the INC direction. Idle speed should decrease when switch 10 is rotated in the DEC direction. If the mechanic desires, a tachometer may be connected to the engine to measure the idle speed when switch 10 is rotated. The idle speed should change about 28 RPM for each position that switch 10 is rotated. If the idle speed behavior is consistent with the rotation of switch 10, then the IAC stepper motor is working correctly. If the idle speed behavior is not consistent with the rotation of switch 10, then the IAC stepper motor is defective. All that remains is to test the other elements of the idle speed control circuit shown in FIG. 2.

To test the other elements, the device is connected as shown in FIG. 1 and 3. The NORMAL-TEST switch control 11 of FIG. 5 is set to NORMAL position. RPM INC-DEC switch 10 is not used when NORMAL-TEST switch 11 is in the NORMAL position.

With reference to FIG. 3, the cold engine is started and the mechanic observes all four LEDs on the device while the engine warms up. The COOLANT TEMP SENSOR sends a temperature signal to the ECM. The ECM receives the temperature signal and sends idle speed control signals to reduce the idle speed as the engine warms up. During warm-up, the idle speed control signals change in a distinctive pattern which can be easily seen on the display LEDs of the device. The pattern is shown in Table 2 below.

TABLE 2

| Sequence | LED 20 | LED 21 | LED 22 | LED 23 |
|---|---|---|---|---|
| First | OFF | ON | ON | OFF |
| Second | ON | OFF | ON | OFF |
| Third | ON | OFF | OFF | ON |
| Fourth | OFF | ON | OFF | ON |
| Fifth | OFF | ON | ON | OFF |
| Sixth | ON | OFF | ON | OFF |

The above pattern continues as the engine warms up. Failure of the LEDs to change as the engine warms up indicates a problem in the coolant temperature sensor. After the engine warms up, the air conditioner control switch is tested. The mechanic observes the LEDs while turning the AIR CONDITIONER CONTROL SWITCH on and off. All four LEDs should rapidly flash several times every time the CONTROL SWITCH is turned on or off. The flashing is so rapid that all four LEDs will appear to be flashing at the same time. Failure of the LEDs to flash several times indicates a problem in the AIR CONDITIONER CONTROL SWITCH or the ECM.

The remaining element is the IGNITION SWITCH of FIG. 3. When the IGNITION SWITCH is turned off, the computer send signals to IAC 25 to prepare the engine for fast idle at the next engine start. The four LEDs indicate the fast idle signals to the mechanic. If all four of the LEDs do not flash, then a problem is indicated in the ignition switch.

It is common for the mechanic to distrust his test equipment. The present device has built-in features so that it can test itself. If the mechanic desires, he may test the device by connecting connector 4 to connector 3 as shown in FIG. 4. The mechanic then selects TEST on switch 11 and rotates switch 10 through all twelve positions while watching the on-off light pattern on LEDs 20, 21, 22, and 23. The pattern should agree with Table 3.

TABLE 3

| Switch 10 Position | LED20 | LED21 | LED22 | LED23 |
|---|---|---|---|---|
| 1 | OFF | ON | ON | OFF |
| 2 | ON | OFF | ON | OFF |
| 3 | ON | OFF | OFF | ON |
| 4 | OFF | ON | OFF | ON |
| 5 | OFF | ON | ON | OFF |
| 6 | ON | OFF | ON | OFF |
| 7 | ON | OFF | OFF | ON |
| 8 | OFF | ON | OFF | ON |
| 9 | OFF | ON | ON | OFF |
| 10 | ON | OFF | ON | OFF |
| 11 | ON | OFF | OFF | ON |
| 12 | OFF | ON | OFF | ON |

The mechanic may compare the LED flashing pattern with the above list and verify that all the parts of the device are functioning correctly. No other test equipment is required to perform this self test.

The self test function may be seen by reference to FIG. 4 and FIG. 7. To perform the self test the mechanic connects connector 4 to connector 3 as shown in FIG. 4. This same connection may be visualized by mentally connecting connector 4 to connector 3 in FIG. 7. This connection connects the output poles of switch 11 to the input pins of connector 3. This carries the test control signals of switch 10 through to LEDs 20, 21, 22, and 23. The mechanic then rotates switch 10 and verifies that the light pattern matches Table 3. Conformance to Table 3 verifies the functioning of the test device.

The device may also be used to adjust the length of the pintle extension before installing a new stepper motor into an engine. Specifications require that the pintle length be precisely adjusted before installation. Automobile handbooks specify adjustment by pushing or pulling on the pintle with your fingers. Adjusting pintle length in this manner is very unsatisfactory and could damage a new stepper motor. The present invention provides the mechanic with a better method to adjust the length of the pintle in a new stepper motor.

Device connector 4 is connected to the new stepper motor. Device connector 3 is not connected to anything. Switch 11 is set to TEST. Switch 10 is rotated as required while the mechanic watches the pintle extend or retract until the length agrees with the specification. Adjustment of the pintle length in this way also provides a functional test of the new stepper motor before it is installed in the engine.

The above describes the preferred embodiment which applicant has reduced to practice and successfully tested on several engines. The fundamental principle here described is to interpose a test device between the computer (ECM) and the device which the computer controls (IAC). The principle is not limited to the embodiment described above. The principle may be applied to the testing of almost any computer controlled element in an automobile engine.

What is claimed is:

1. A test instrument for driving a two-coil stepper motor comprising a four-pole multi-position non-shorting mechanical rotary switch connected for switching polarities from a direct current source to both coils of said stepper motor with each step of said rotary switch from one said position to another thereby to turn said stepper motor in one step increments for each said step of said rotary switch in a direction dependent on the direction of movement of said rotary switch.

2. A test instrument for testing the operation of the idle speed control system in an automotive engine where the idle speed is set by a two-coil stepper motor driven through a multi-conductor engine cable connected to the output of an engine control computer, comprising:

indicator means for displaying output signals of said control computer on said engine cable;
stepper drive means for driving said stepper motor;
first connector means for connecting said indicator means to said engine cable;
second connector means for connecting to the coils of said stepper motor; and
first switch means for selectively connecting said second connector means either to said stepper drive means in a first mode of operation or to said first connector means in a second mode of operation of said test instrument.

3. The instrument of claim 2 wherein said stepper drive means comprises four-pole multiple-position second switch means connected for switching voltage polarities at said second connector means to turn said stepper by changing positions of said second switch means.

4. The instrument of claim 3 further comprising a battery connected to said second switch means for supplying said polarities to said stepper motor.

5. The instrument of claim 3 wherein said second switch means is a manually operated mechanical switch.

6. The instrument of claim 2 wherein said indicator means, said stepper drive means, and said first switch means are mounted to a common housing.

7. The instrument of claim 6 wherein said common housing has a front panel and said indicator means and said first switch means are mounted on said front panel, and said stepper drive means has control means also mounted on said front panel.

8. The instrument of claim 7 wherein said panel has a left side and a right side, said first connector is attached to said housing at said left side, said second connector is attached to said housing at said right side, said indicator means are proximal to said left side, and said stepper drive control means are proximal to said right side.

9. The instrument of claim 2 wherein said indicator means are visual indicators and include a separate indicator for each conductor of said engine cable.

10. The instrument of claim 2 wherein said first and second connector means are mateable to each other in a self-test mode of the instrument for displaying the output of said stepper drive means on said indicator means thereby to verify operation of said stepper drive means.

11. A test instrument for testing the operation of the idle speed control system in an automotive engine where the idle speed is set by a two-coil stepper motor driven by an engine control computer through a four conductor engine cable, comprising:
   a common housing;
   visual indicator means mounted to said housing associated with each conductor of said engine cable for displaying computer output signals on said each conductor;
   first connector means for connecting said indicator means to said engine cable;
   second connector means for connecting to the coils of said stepper motor;
   a battery in said housing;
   first switch means mounted to said housing and connected to said battery for mechanically switching polarities at said second connector means to turn said stepper motor in one step increments in a selected direction; and
   second switch means mounted to said housing for selectively connecting said second connector means either to said first switch means in a first mode of operation or to said first connector means in a second mode of operation of said test instrument.

12. The instrument of claim 11, wherein said common housing has a front panel, and said indicator means, said first switch means and said second switch means are mounted on said front panel; and
wherein said panel has a left side and a right side, said first connector is attached to said housing at said left side, said second connector is attached to said housing at said right side, said indicator means are proximal to said left side, said first switch means are proximal to said right side, and said second switch means are intermediate said indicator means and said second switch means.

13. The instrument of claim 12 further comprising first and second groups of test connection points on said front panel for electrically connecting other test instruments to said first connector means and said second connector means respectively.

14. The instrument of claim 13 wherein said first and second groups each include a test point for each said conductor in the engine cable, and each said test point in said first group is adjacent to said visual indicator means associated with the corresponding conductor.

15. The instrument of claim 13 wherein said visual indicator means and said test points of the first group are arranged in parallel columns adjacent said left side of the panel, and further comprising indicia on said panel indicative of the stepper motor coil connections made by said conductive and said test points.

16. The instrument of claim 13 further comprising indicia on said panel indicative of the connections made by said second connector means between said second group of test connection points and said stepper motor and of the impedance values of the coils of said stepper motor.

17. The instrument of claim 12 further comprising indicia on said panel for suggesting connection between said first connector means and the engine cable and between said second connector and the stepper motor under test.

18. A test instrument for testing the operation of the idle speed control system in an automotive engine where the idle speed is set by a two-coil stepper motor driven by an engine control computer through a four conductor engine cable, comprising:
   visual indicator means associated with each conductor of said engine cable for displaying computer output signals on said each conductor;
   first connector means for connecting said indicator means to said engine cable;
   second connector means for connecting to the coils of said stepper motor;
   mode switch means for selectively connecting said second connector means either to said stepper drive means in a first mode of operation or to said first connector means in a second mode of operation of said test instrument; and
   a four-pole multi-position non-shorting mechanical rotary second switch connected to a direct current source for switching polarities at said second connector means with each step of said second switch from one said position to another in a sequence adapted to turn said stepper motor in one step increments in a direction dependent on the direction of movement of said second switch.

* * * * *

UNITED STATES PATENT AND TRADEMARK OFFICE
CERTIFICATE OF CORRECTION

PATENT NO. : 5,124,919
DATED : June 23, 1992
INVENTOR(S) : Harald W. Kastelle

It is certified that error appears in the above-identified patent and that said Letters Patent is hereby corrected as shown below:

Column 1, lines 17 to 18 reads "and difficult", should read --and other factors. Troubleshooting this function is often very difficult.--
Column 2, line 66 reads "instrument I for", should read --instrument for--
Column 4, line 12, reads "FIG. i", should read --FIG 1.--
Column 5, line 9 reads " resistors 24 are wired as shown in FIG. 7", should read --LEDs 20 through 23 are wired as shown in FIG. 7. Four resistors 24 are wired as shown in FIG. 7.--
Column 5, line 36 reads "turned on", should read --turned on or off.--
Column 8, line 5 reads "is not to by inspection", should read --is not easy to see by inspection--
Column 10, line 40 reads "TEST switch 11", should read --NORMAL-TEST switch 11--

Signed and Sealed this

Seventh Day of September, 1993

Attest:

BRUCE LEHMAN

Attesting Officer

Commissioner of Patents and Trademarks